G. S. GOBLE.
Hose-Couplings.
No. 142,388.  Patented September 2, 1873.
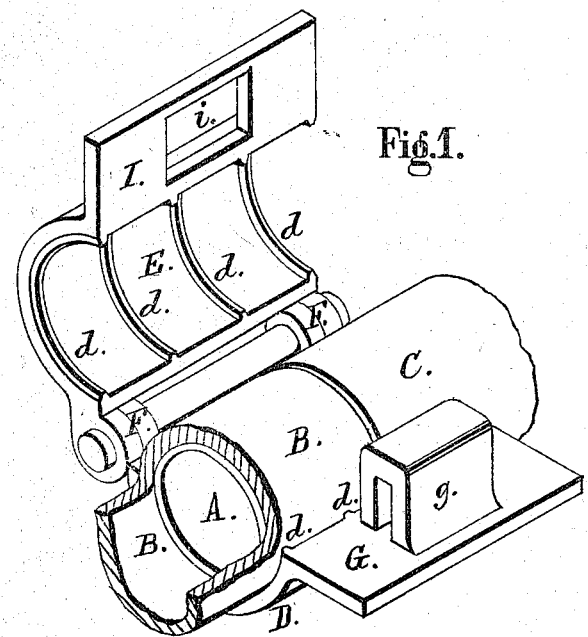
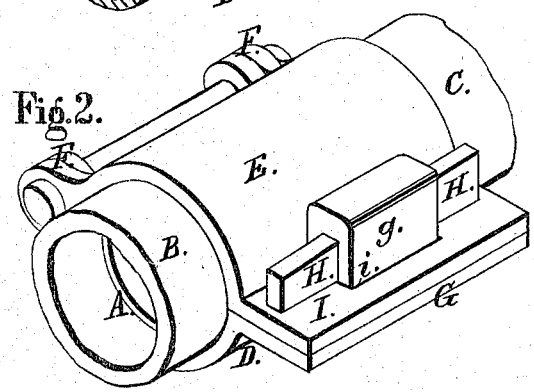
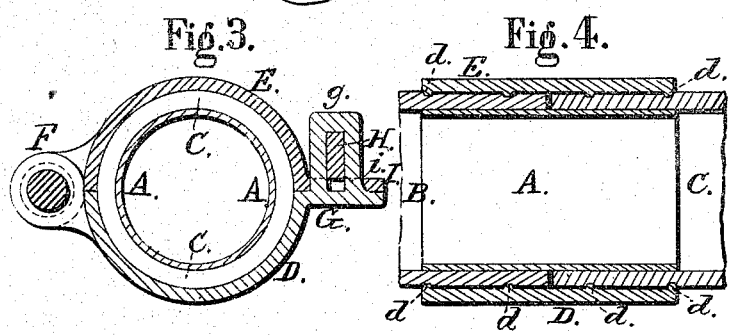
ATTEST:
Robert Burns.
Walter Allen.
INVENTOR:
George S. Goble
By Knight Bros, Attorney

UNITED STATES PATENT OFFICE.

GEORGE S. GOBLE, OF ST. LOUIS, MISSOURI.

IMPROVEMENT IN HOSE-COUPLINGS.

Specification forming part of Letters Patent No. 142,388, dated September 2, 1873; application filed June 24, 1873.

*To all whom it may concern:*

Be it known that I, GEORGE S. GOBLE, of St. Louis, St. Louis county, Missouri, have invented a certain Improvement in Coupling for Hose, of which the following is a specification:

My improvement consists in the combination of a metallic pipe to give interior support to the ends of the hose, and jointed clamp on the outside thereof, the clamp consisting of two parts, hinged together at one side, and forced and held together by a wedge at the other side, as shown.

In the drawing, Figure 1 is a perspective view, with the clamp open, and part of the hose broken away to exhibit the interior supporting-ring. Fig. 2 is a perspective view, with the clamp closed. Fig. 3 is a transverse section at X X, Fig. 4. Fig. 4 is a longitudinal section at Y Y, Fig. 3.

A is a cylindrical piece of metallic pipe, which is inserted in the ends B C of the hose to give to them interior support against the pressure of the hinged sleeve or clamp upon the outside. The clamp consists of two semi-cylindrical portions, D E, having interior ribs d, as shown, to take firm hold of the ends of the pipe, and prevent their escape from the clamp. The parts D E are connected by hinges F. G is a flange at the edge of the part D, having a lug, g, slotted to receive the wedge H, by which the clamp is compressed, and held tightly on the hose. I is a flange, similar to that G, except that in place of the lug g it has an orifice, i, to allow the passage of the said lug.

This improvement is suitable for both temporary and permanent use, as it can be applied with great speed to a ruptured pipe, and, being cheap, effectual, and devoid of projecting parts liable to injury, forms a desirable permanent coupling. It is applicable to all sizes of hose, and to hose of any material in use in the manufacture of the same. It will outlast the hose, and can be readily removed from old hose to new.

In application of this coupling the ends B C are cut off transversely, if not already so, and the pipe A inserted into the ends. The hinged clamp is then drawn together on the ends of the hose, as shown, and the wedge H driven into the slotted lug g to clamp the parts D E firmly upon the hose.

I claim as my invention—

The non-elastic hose-coupling consisting of the pipe A and the clamp D E G g H I i, made substantially as proposed, in combination with the hose B C, as set forth.

GEORGE S. GOBLE.

Witnesses:
SAML. KNIGHT,
ROBERT BURNS.